3,415,614
PROCESS AND COMPOSITION FOR RETARDING WATER EVAPORATION
Richard R. Egan, Edina, and Stanley R. Sheeran, Minneapolis, Minn., assignors, by mesne assignments, to Ashland Oil and Refining Company, a corporation of Kentucky
No Drawing. Filed Feb. 16, 1966, Ser. No. 527,728
10 Claims. (Cl. 21—60.5)

This invention relates to a process and compositions effective to reduce surface evaporation of water. In another aspect, this invention relates to a process and compositions effective in the reduction of surface evaporation of water in open tanks, ponds, lakes and reservoirs. In a third aspect, this invention relates to the application to the surface of water of a composition comprising long chain primary alcohols and a dispersing agent.

A serious problem, encountered by agriculture, industry and those individuals who are concerned with water supplies for cities, is the evaporation of water to the atmosphere during the summer months, particularly during long periods of drought. Those who raise cattle and other livestock and also those who use water for irrigation, industrial purposes and for drinking are faced every year with water shortages during the summer months when there is little or no rain.

It has been estimated that, in hotter climates, the rate of evaporation causes loss from reservoirs or the like far in excess of the quantity used by consumers. In some areas, only about one-fifth of the stored water reaches the consumer, four-fifths being lost by evaporation due to the action of the elements such as the sun and winds.

It has previously been suggested that certain chemical compounds can be added to reservoirs of water to prevent surface evaporation. Of course, any chemical which is to be added to water must be harmless to both animals and plants and must be such that the surface evaporation is reduced economically. Thus far, the most desirable materials suggested by the prior art have been the long-chain, solid, aliphatic alcohols, which, when suitably dispersed on the surface of a body of water, form a monomolecular layer effective to materially retard surface evaporation. Materials, such as myristyl, cetyl and stearyl alcohols, for example, have been found in laboratory experiments to effect a pronounced reduction in surface evaporation.

Even though the art is aware of the evaporation-retardation properties of these long-chain, solid alcohols, no one has yet been able to obtain a dispersion of the alcohol on the surface of bodies of water of any significant size without a dispersant. Since the long-chain, solid, aliphatic alcohols are essentially non-dispersing, an attempt to disperse the alcohols without a dispersant does not give a dispersion sufficient to form a monomolecular layer.

At room temperature, small particles of cetyl alcohol and stearyl alcohol deposited on a water surface do not give a monolayer. This can be demonstrated by depositing a small piece of cetyl alcohol on a clean surface of water covered with calcined talcum powder at room temperature. The talcum powder is not pushed away, thereby showing that the cetyl does not spread. In order to obtain a monolayer, it is necessary to combine with the long-chain alcohol, a substance which will allow the spreading of the alcohol. The dispersant to be mixed with the long-chain, aliphatic alcohol, or mixture of alcohols, must be compatible with the mixture; it must be non-toxic; it should have a high spreading pressure; it should not give a mixed film and it must be such that it can be removed from the alcohol by the water.

A primary object of this invention, therefore, is a composition which, when dispersed in a body of water, will effectively retard surface evaporation of the water by forming a vapor-resistant chemical barrier on the said surface.

An additional object of the invention is a process for dispersing a monomolecular layer of a long-chain, solid, aliphatic alcohol on the surface of a body of water to retard surface evaporation.

A further object of the present invention is a self-dispersing composition which will effectively reduce surface evaporation of water when added thereto.

Another object of the invention is a self-dispersing composition comprising an evaporation-inhibiting long-chain alcohol and a liquid heterocyclic compound having a five-membered ring, one member of which is oxygen, such as tetrahydrofuran and tetrahydrofurfuryl alcohol.

In accordance with the present invention, we have discovered that solid, long-chain, aliphatic alcohols, or mixtures thereof, may be dispersed on the surface of a body of water by application from solution (solid or liquid) in a liquid heterocyclic compound having a five-membered ring, one member of which is oxygen, such as tetrahydrofuran and tetrahydrofurfuryl alcohol. Preferably, the composition of the present invention comprises from about 75 to about 95% long-chain, solid, aliphatic alcohol having from 12 to 20 carbon atoms and from about 5 to about 25% five-membered heterocyclic compound. The most preferred compositions of this invention comprise from about 85 to about 95% of an alcohol mixture comprising cetyl and stearyl alcohols and having a predominant chain length of about 50 to about 70% $C_{18}$ and from about 5 to about 15% of either tetrahydrofuran or tetrahydrofurfuryl alcohol.

The long-chain, solid, aliphatic alcohols which are operable in accordance with this invention contain at least 12 carbon atoms and include myristyl, cetyl and stearyl alcohols and mixtures thereof. Preferably, the alcohols are present in the composition as a mixture of alcohols having from 14 to 18 carbon atoms, i.e., myristyl, cetyl and stearyl alcohols. The most preferred long-chain alcohol mixture is a mixture of cetyl and stearyl alcohols having a hydroxyl number of from 180 to 240, preferably 200 to 220, an iodine value of less than 4, preferably less than 2, a saponification value of about 1 to 5, preferably about 3, a cloud point of 30° to 60° F., preferably about 42° to 55° F., and a predominant chain length of about 40 to 70% $C_{18}$, preferably about 55 to 65% $C_{18}$.

The liquid heterocyclic compound, having a five-membered ring, one member of which is oxygen, operable in the invention as dispersing agents are preferably furans or furan derivatives, such as tetrahydrofuran, tetrahydrofurfuryl alcohol, furan, dihydrofuran, furfuryl alcohol, dihydrofurfuryl alcohol, and the like.

The compositions of this invention are prepared by mixing the long-chain, solid alcohol having from 12 to 20, preferably from 14 to 18, carbon atoms with from about 5 to about 25% by weight of the liquid heterocyclic compound, having a five-membered ring, one member of which is oxygen, in a suitable vessel and heating at a temperature above the melting point of the solid alcohol until a solution is obtained. It is important that the normally solid composition be essentially homogeneous when used in this process; thus, cooling of the mixture should be conducted so that the components do not separate due to their varying melting points. If separation should occur, the self-dispersing characteristics and thus the evaporation-inhibiting characteristics are severely decreased. Preferably, therefore, the molten mixture should be rapidly quenched to insure homogeneity of the product.

It is important to this invention that the heterocyclic dispersant be present in the composition in an amount from about 5% to about 25%, since if lesser or greater amounts are used, the efficiency is lost. That is, if too small an amount of dispersant is used, the composition would not spread effectively; on the other hand, if too large an amount is used, the composition would be too soft and much of the monomolecular layer would be washed away. It has been found that the preferred amount of dispersant in the composition is about 10% by weight.

Under ordinary conditions, the composition, which floats on water, will be employed in the form of a block or cylinder suitably anchored to float in the center of the water surface which is to be covered with the monomolecular layer. One ten-pound block of the composition is desirably employed for each six acres of water surface and will maintain a monomolecular layer on a surface of such size for about three months if severe winds are not encountered.

Of course, the composition can be added to the water in pellets, beads and other finely-divided forms and can be added by hand or from a boat or plane as desired.

Functional groups, such as carboxyl, ester, keto or aldehyde groups should not be present in the composition, since such groups adversely affect the dispersibility of the solid alcohol and the vapor-resistant-barrier effect of the film. It is desirable, however, to incorporate a mild germicide in the composition to prevent attack on the film by bacteria. Suitable germicides are phenol, o-phenylphenol, o-benzyl-4-chlorophenol, cresylic acid, resorcinol, o-chlorophenylphenol, and the like. Preferably, the germicide will be included in concentrations of from about 0.1 to about 1.0% by weight of the composition.

The invention is further described by the following examples, in which all parts are parts by weight unless otherwise specified. These examples are illustrative only and do not constitute limitations on the invention.

EXAMPLE I

This example illustrates the spreading power of the compositions of the present invention.

95 parts of Adol 63 (a commercial product of the Archer-Daniels-Midland Company containing cetyl and stearyl alcohols) having the following properties:

| | |
|---|---|
| Acid value (maximum) | 1.0 |
| OH value | 208–218 |
| Iodine value (maximum) | 2.0 |
| Cloud point (° C.) | 46–51 |
| Titer (° C.) | 47–52 |
| C.T. melt point (° C.) | 47–53 |
| Saponification value | 3.0 |
| Specific gravity | .816 |
| Approximate composition (percent): | |
| $C_{12}$ | 1 |
| $C_{14}$ | 4 |
| $C_{16}$ | 32 |
| $C_{18}$ | 62 |
| $C_{20}$ | 1 | was melted. To the molten alcohol mixture was added 5 parts 2-ethyl hexanol.

To another vessel was added 95 parts of the above solid alcohol, and the alcohol was melted. 5 parts tetrahydrofuran were added to this molten alcohol mixture.

To a third container was added 90 parts of the above solid alcohol, which was then melted, and 10 parts tetrahydrofuran were added to the molten alcohol.

To a fourth container was added 100 parts of the solid alcohol.

To a fifth container was added 90 parts of the solid alcohol, and the solid alcohol was melted. Then, 10 parts tetrahydrofurfuryl alcohol were added.

The samples were labeled 1, 2, 3, 4 and 5 respectively. Each of the samples was tested for spreading power by adding small amounts of each to the centers of calcined talcum powder-covered water surfaces 27 cm. in diameter. The spreading power was noted as follows:

| | Dispersant | Percent Dispersant | Spreading Power |
|---|---|---|---|
| Sample #: | | | |
| 1 | 2-ethyl hexanol | 5 | Very good. |
| 2 | Tetrahydrofuran | 5 | Do. |
| 3 | do | 10 | Do. |
| 4 | None | | No spreading power. |
| 5 | Tetrahydrofurfuryl alcohol | 10 | Good. |

EXAMPLE II

This example illustrates the evaporation-retardation effect of a solid solution containing 95% of the solid alcohol mixture described in Example I and 5% tetrahydrofuran.

Two identical containers, containing equal amounts of distilled water, were obtained. To one of the containers is added a small amount of a solid solution comprising 95% Adol 63 (described in Example I) and 5% tetrahydrofuran prepared as in Example I. The temperature of the atmosphere and of the water was 77° F. At various intervals of time, the water samples were weighed to determine the effect of the evaporation retarding composition. At the end of 19 hours, the percent retardation was found to be 30%, i.e., the sample to which no evaporation-retarding composition was added weighed 30% less than that to which the composition was added.

EXAMPLE III

This example illustrates the comparative evaporation retardation of compositions of the present invention.

Samples of evaporation-retarding compositions were prepared as follows:

(1) 90 parts Adol 63 (see Example I) were melted in a suitable vessel. To the molten material were added 10 parts tetrahydrofuran. This sample was designated as sample A.

(2) 95 parts Adol 63 were melted in a vessel, after which 5 parts tetrahydrofurfuryl alcohol were added. This mixture was designated as sample B.

(3) 90 parts Adol 63 were melted in a vessel, after which 10 parts tetrahydrofurfuryl alcohol were added. This sample was designated as sample C.

(4) 90 parts Adol 63 were melted and mixed with 10 parts 2-ethyl hexanol. This mixture was sample D.

Each sample was tested as in Example II, i.e., two identical containers, containing equal amounts of distilled water, were obtained. To one container was added a small amount of one of the samples. The temperature was recorded and the weights of the pure water and the water containing the sample were measured after a pre-determined period of time. The final weight of the pure sample was divided into the excess weight lost by the pure sample to determine the percent of retardation. The results were as follows:

| Sample | Dispersant | Percent Dispersant | Teperature (° F.) | Percent Retardation |
|---|---|---|---|---|
| A | Tetrahydrofuran | 10 | 75 | 37.3 |
| B | Tetrahydrofurfuryl alcohol | 5 | 75 | 31.9 |
| C | do | 10 | 75 | 42.9 |
| D | 2-ethyl hexanol | 10 | 75 | 32.9 |

In accordance with the foregoing examples, it will be seen that, by employing the process and composition of the invention, it is possible to effect a reduction in surface evaporation of water.

While the invention has been described with reference to specific embodiments, it will be apparent to those skilled in the art that various modifications may be made and the equivalent substituted therefor without departing from the principles and true nature of the present invention.

We claim:

1. A normally solid, self-dispersing composition useful as an additive to water for retardation of surface evaporation which comprises a homogeneous mixture of at least one solid, aliphatic alcohol, having from 12 to 20 carbon atoms and from about 5 to about 25% by weight of said solid alcohol of a liquid, heterocyclic compound having a five-membered ring, one member of which is oxygen.

2. The composition of claim 1 wherein the solid, aliphatic alcohol has from 14 to 18 carbon atoms.

3. The composition of claim 1 wherein the said liquid, heterocyclic compound is selected from the group consisting of tetrahydrofuran and tetrahydrofurfuryl alcohol.

4. The composition of claim 1 wherein said solid, aliphatic alcohol is a mixture comprising major amounts of cetyl and stearyl alcohols.

5. The composition of claim 1 wherein said solid composition contains about 10% of said liquid heterocyclic compound.

6. A process for retarding surface evaporation from bodies of water which comprises adding to said body of water a normally solid composition comprising at least one solid, aliphatic alcohol having from 12 to 20 carbon atoms and from about 5 to about 25% by weight of said solid alcohol of a liquid heterocyclic compound having a five-membered ring, one member of which is oxygen.

7. The process of claim 6 wherein said solid, aliphatic alcohol has from 14 to 18 carbon atoms.

8. The process of claim 6 wherein said heterocyclic compound is selected from the group consisting of tetrahydrofuran and tetrahydrofurfuryl alcohol.

9. The process of claim 6 wherein said solid, aliphatic alcohol is a mixture comprising major amounts of cetyl and stearyl alcohols.

10. The process of claim 6 wherein said solid composition contains about 10% of said heterocyclic compound.

References Cited

UNITED STATES PATENTS 3,082,058 3/1963 Rosano _____ 21—60.5
3,154,505 10/1964 Watanabe _____ 21—60.5

FOREIGN PATENTS 224,416 10/1959 Australia.

OTHER REFERENCES

"The Furans," The Quaker Oats Co., pp. 12–14, Chicago, Ill., 1941.

L. Scheflan et al.: "The Handbook of Solvents," pp. 635–636, D. Van Nostrand Co., Inc., New York, 1953.

MORRIS O. WOLK, *Primary Examiner.*

SIDNEY MARANTZ, *Assistant Examiner.*